(12) United States Patent
Kurokawa et al.

(10) Patent No.: US 8,576,677 B2
(45) Date of Patent: Nov. 5, 2013

(54) OPTICAL SIGNAL DETECTING CIRCUIT AND INFORMATION REPRODUCING DEVICE USING THE SAME

(75) Inventors: Takahiro Kurokawa, Fujisawa (JP); Hideharu Mikami, Kawasaki (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 643 days.

(21) Appl. No.: 12/420,897

(22) Filed: Apr. 9, 2009

(65) Prior Publication Data

US 2009/0257327 A1  Oct. 15, 2009

(30) Foreign Application Priority Data

Apr. 10, 2008  (JP) .................................. 2008-102645

(51) Int. Cl.
 *G11B 7/00*  (2006.01)
(52) U.S. Cl.
 USPC ...................... 369/44.22; 369/44.41; 369/120
(58) Field of Classification Search
 None
 See application file for complete search history.

(56) References Cited

U.S. PATENT DOCUMENTS

| | | | |
|---|---|---|---|
| 8,320,230 B2 * | 11/2012 | Huang et al. | 369/124.01 |
| 2002/0041542 A1 * | 4/2002 | Sano et al. | 369/44.23 |
| 2003/0072228 A1 | 4/2003 | Izumi | |
| 2005/0237867 A1 * | 10/2005 | Kuze et al. | 369/30.3 |
| 2006/0007838 A1 * | 1/2006 | Nakata et al. | 369/112.12 |
| 2006/0215521 A1 * | 9/2006 | Yak et al. | 369/53.23 |
| 2007/0014212 A1 * | 1/2007 | Aoki et al. | 369/44.41 |

FOREIGN PATENT DOCUMENTS

| | | |
|---|---|---|
| EP | 0 268 321 | 5/1988 |
| EP | 0 372 650 | 6/1990 |
| EP | 0 520 461 | 12/1992 |
| JP | 03-285408 | 12/1991 |

* cited by examiner

*Primary Examiner* — Joseph Haley
*Assistant Examiner* — Emily Frank
(74) *Attorney, Agent, or Firm* — Antonelli, Terry, Stout & Kraus, LLP.

(57) ABSTRACT

An object of the present invention is to achieve both low noise and fast response in an optical signal detecting circuit capable of providing all of three signals—a focus error signal, a tracking error signal, and an RF signal—with only a single detection system. A single current-to-voltage converter converts a current signal obtained by adding currents flowing through two photodiodes, into a voltage signal. Not only currents flowing into the photodiodes, but also currents flowing out from the photodiodes are taken out as the voltage signals. Moreover, by applying two different reference voltages to the current-to-voltage converters, a reverse bias voltage is applied between the terminals of each photodiode.

6 Claims, 7 Drawing Sheets

Signal generating circuit

OPTICAL SIGNAL DETECTING CIRCUIT AND INFORMATION REPRODUCING DEVICE USING THE SAME

CLAIM OF PRIORITY

The present application claims priority from Japanese patent application JP 2008-102645 filed on Apr. 10, 2008, the content of which is hereby incorporated by reference into this application.

BACKGROUND OF THE INVENTION

1. Field of the Invention

The present invention relates to an optical signal detecting circuit, and particularly to an optical signal detecting circuit suitable for performing optical pickup in an information reproducing device.

2. Description of the Related Art

An optical disk, typified by a digital versatile disk (DVD), has information recorded on its information recording surface in lines of minute marks (or pits). The recorded information is reproduced as an RF signal (reproduction signal) which is obtained as follows. A laser light is condensed by an objective lens and applied onto the information recording surface. A change in the intensity of the light reflected is detected based on the differences in reflectivity between the marks and spaces between the marks. The change thus detected is converted into the RF signal. In reproducing information, it is necessary to cause a condensed point of the laser light to accurately follow the mark lines on the information recording surface so as to accurately detect the minute pits. To cause the condensed point to follow the mark lines, the position of the objective lens is adjusted as follows. Specifically, an optical means detects a positional shift of the condensed point from the information recording surface in an optical axial direction as well as a positional shift of the condensed point from the mark lines in a radial direction of the disk. These positional shifts are converted into electronic signals called a focus error signal and a tracking error signal, respectively. These signals are then fed back to adjust the position of the objective lens.

FIG. 2 shows a typical configuration of an optical signal detecting circuit that converts optical signals into electronic signals in an optical disk device. A quadrant photodiode is used as a light receiving element. Currents $I_1$, $I_2$, $I_3$, and $I_4$ flow though photodiodes 201, 202, 203, and 204, respectively. Here, the currents $I_1$, $I_2$, $I_3$, and $I_4$ have magnitudes proportional to the intensities of light received by the respective photodiodes 201, 202, 203, and 204. The currents $I_1$, $I_2$, $I_3$, and $I_4$ are converted into voltage signals $V_1$, $V_2$, $V_3$, and $V_4$ by current-to-voltage converters 211, 212, 213, and 214, respectively, each consisting of an operational amplifier and a feedback resister. As shown in the following equations, each current-to-voltage converter outputs a voltage proportional to the current flowing through the corresponding photodiode.

$$\begin{cases} V_1 = RI_1 \\ V_2 = RI_2 \\ V_3 = RI_3 \\ V_4 = RI_4 \end{cases} \quad (1)$$

, where R is the value of the feedback resister of the current-to-voltage converter. Typically, the frequency response characteristics of each photodiode are improved by reducing the terminal capacitance of the photodiode through application of a reverse bias voltage thereto. In the configuration example shown in FIG. 2, each photodiode is reverse-biased since, due to the virtual short characteristics of the amplifiers, a potential of the cathode of the photodiode which is connected to the inverting input terminal of the corresponding operational amplifier is equal to a positive reference potential $V_{ref}$ applied to each of the non-inverting input terminals.

A focus error signal (FE), a tracking error signal (TE), and an RF signal (RF) are generated by performing addition and subtraction on $V_1$, $V_2$, $V_3$, and $V_4$ as shown in the following equations.

$$\begin{cases} FE = (V_1 + V_3) - (V_2 + V_4) \\ TE = (V_1 + V_4) - (V_2 + V_3) \\ RF = V_1 + V_2 + V_3 + V_4 \end{cases} \quad (2)$$

Assume that an astigmatism method and a push-pull method are employed as a focusing control method and a tracking control method, respectively. The optical signal detecting circuit having the quadrant photodetector as described above has an advantage of simplifying a reproducing optical system because of its capability of providing signals necessary for reproducing information with only a single detection system without having separate detection systems for servo and for providing an RF signal.

Japanese Patent Application Publication No. Hei 3-285408 (referred to as Patent Document 1 below) describes a light detecting circuit. This light detecting circuit includes four photodiodes combined in a quadrilateral form, two amplifiers each serving as a current-to-voltage converter, two voltage sources, and two current detecting resisters. The cathode of the first photodiode is connected to the cathode of the second photodiode, and their connection point is connected to the inverting input terminal of the first amplifier. The anode of the second photodiode is connected to the cathode of the third photodiode, and their connection point is grounded via the second voltage source and the second current detecting resister as well as being connected to the non-inverting input terminal of the second amplifier. The anode of the third photodiode is connected to the anode of the fourth photodiode, and their connection point is grounded via the first current detecting resister as well as being connected to the non-inverting input terminal of the first amplifier via the first voltage source. The cathode of the fourth photodiode is connected to the anode of the first photodiode, and their connection point is connected to the inverting input terminal of the second amplifier.

SUMMARY OF THE INVENTION

Noise included in an RF signal mainly includes laser noise, disk noise, shot noise, and amplifier noise, any of which deteriorates the quality of the RF signal and may contribute to an information reproduction error. Among the above noise, the amplifier noise is thermal noise generated in the feedback resister of the current-to-voltage converter. The amplitude of a signal outputted from the current-to-voltage converter is proportional to a feedback resistance value, and the effective value of the amplifier noise is proportional to the square root of the feedback resistance value. Accordingly, the effect of the amplifier noise can be reduced by increasing the feedback resistance value. However, since the frequency band of a circuit is inversely proportional to the feedback resistance value, the feedback resistance value is limited by the required frequency band.

In the optical signal detecting circuit using the quadrant photodiode cited as a conventional technique above, the photodiodes 201, 202, 203, and 204 are connected to the respective current-to-voltage converters 211, 212, 213, and 214 in a one-to-one manner. Thereby, the optical signal detecting circuit generates the RF signal by adding the output signals $V_1$, $V_2$, $V_3$, and $V_4$ of the respective current-to-voltage converters. At that time, the amplifier noise values generated in the respective four current-to-voltage converters are also added. This leads to a problem of increasing amplifier noise components to be included in the RF signal. The effective value of the amplifier noise in this RF signal is $\sqrt{4}$ times, namely twice (6 dB), as large as that in an RF signal generated by a single pair of the photodiode and the current-to-voltage converter.

When there is a predominance of the amplifier noise in the RF signal to affect the quality of the RF signal, the RF signal deteriorates considerably. The amplifier noise becomes predominant in cases such as when a disk such as a multilayer optical disk having been put into practice recently is used. This is because such a disk produces a small amount of reflective light and renders the relative value of the amplifier noise in the signal large. Another case is when a large frequency band is used for operations such as high-speed reproduction, making the integrated value of the amplifier noise large. Accordingly, because of the amplifier noise, there is a limitation on increasing the disk capacity by making the disk multilayered or on increasing the speed for reproduction.

The light detecting circuit of Patent Document 1 is capable of generating an RF signal and either one of a focus error signal and a tracking error signal, and aims to accomplish both low noise and fast response by having a small number of current-to-voltage converters and applying a reverse bias voltage to the photodiodes.

Being able to acquire only a focus error signal and a tracking error signal besides an RF signal, the method of Patent Document 1 assumes that a "sample servo method" using the RF signal is employed as the tracking control method. However, currently-used recording optical disks are made on the assumption that the push-pull method (or a differential push-pull method) is employed as the tracking control method, and have a physical structure that does not support the sample servo method. Accordingly, when such a disk is used, it is impossible to provide all of three signals—the focus error signal, the tracking error signal, and the RF signal—with the method of Patent Document 1.

In addition, in the method of Patent Document 1, the frequency band of a signal inputted to the non-inverting input terminal of the first amplifier used for acquiring RF signals is limited by the product of the resistance value of the first current detecting resister and the sum of the terminal capacitances respectively of the third photodiode and the fourth photodiode. Consequently, an advantageous configuration in which the current-to-voltage converters are formed as transimpedance amplifiers does not produce an effect. As a result, fast response cannot be obtained with the method of Patent Document 1.

An object of the present invention is to achieve both low noise and fast response in an optical signal detecting circuit capable of providing all of three signals—the focus error signal, the tracking error signal, and the RF signal.

In the optical signal detecting circuit of the present invention, a current signal obtained by adding currents flowing through two photodiodes constituting a quadrant photodiode is converted into a voltage signal by a single current-to-voltage converter. In addition, not only the currents flowing into the photodiodes, but also the currents flowing out from the photodiodes are taken out as voltage signals. Moreover, a reverse bias voltage is applied between the terminals of each photodiode by applying two different reference voltages to the current-to-voltage converters.

In other words, the optical signal detecting circuit of the present invention includes: a quadrant photodetector in which first to fourth photodetectors are contiguously arranged counterclockwise in the listed order, each of the photodetectors receiving an optical signal and converting the optical light into a current signal; and first to fourth current-to-voltage converters each of which converts the current signal to a voltage signal and outputs the voltage signal. The first current-to-voltage converter converts a current signal into a first voltage signal and outputs the first voltage signal, the current signal being obtained by adding current signals flowing into the respective first photodetector and second photodetector. The second current-to-voltage converter converts a current signal into a second voltage signal and outputs the second voltage signal, the current signal being obtained by adding current signals flowing out from the respective first photodetector and third photodetector. The third current-to-voltage converter converts a current signal into a third voltage signal and outputs the third voltage signal, the current signal being obtained by adding current signals flowing out from the respective second photodetector and fourth photodetector. The fourth current-to-voltage converter converts a current signal into a fourth voltage signal and outputs the fourth voltage signal, the current signal being obtained by adding current signals flowing into the respective third photodetector and fourth photodetector. Moreover, by applying a first reference voltage to the second current-to-voltage converter and the third current-to-voltage converter and applying a second reference voltage larger than the first reference voltage to the first current-to-voltage converter and the fourth current-to-voltage converter, a reverse bias voltage is applied to the first photodetector, the second photodetector, the third photodetector, and the fourth photodetector, the reverse bias voltage equal to a difference between the second reference voltage and the first reference voltage. Thereby, a reverse bias voltage equal to a difference between the second reference voltage and the first reference voltage is applied to each of the first to fourth photodetectors constituting the quadrant photodetector.

Additionally, the optical signal detecting circuit further includes at least one of: a first adder that adds the first voltage signal and the fourth voltage signal, and outputs a first RF signal; and a second adder that adds the second voltage signal and the third voltage signal, and outputs a second RF signal.

According to the optical signal detecting circuit of the present invention, all of three signals—the focus error signal, the tracking error signal, and the RF signal—can be provided with a signal detection system. As a result, an optical system performing optical pickup can be simplified. In addition, the effect of the amplifier noise to be included in the reproduction signal can be reduced to a large degree. Thereby, the probability of occurrence of an error in reproducing information can be lowered drastically. Further, both low noise and fast response can be achieved. Accordingly, a low-cost optical disk drive device with high performance can be provided.

DESCRIPTION OF THE PREFERRED EMBODIMENTS

Embodiments of the present invention will be described below with reference to the drawings.

[Embodiment ] Basic structure

Figure 1:
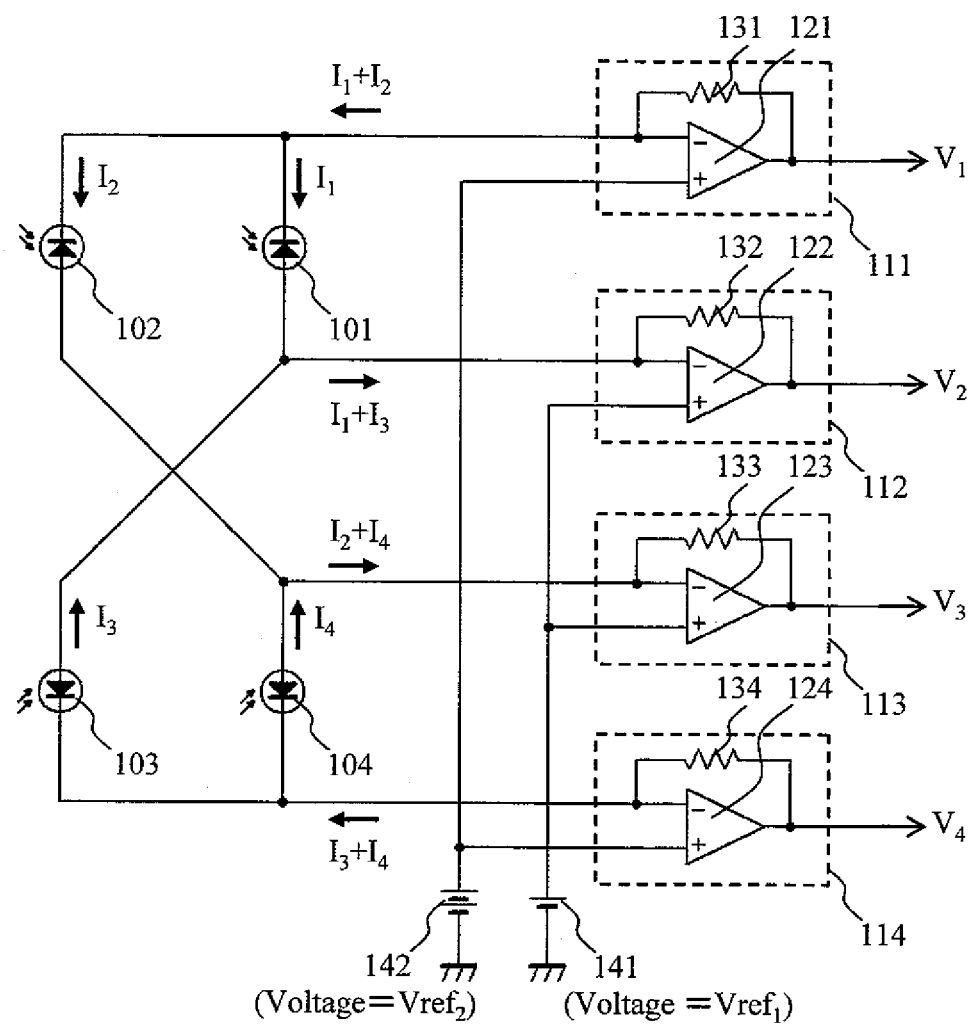
FIG. 1 is a diagram showing a configuration example of an optical signal detecting circuit according to the present invention.
Figure 2:
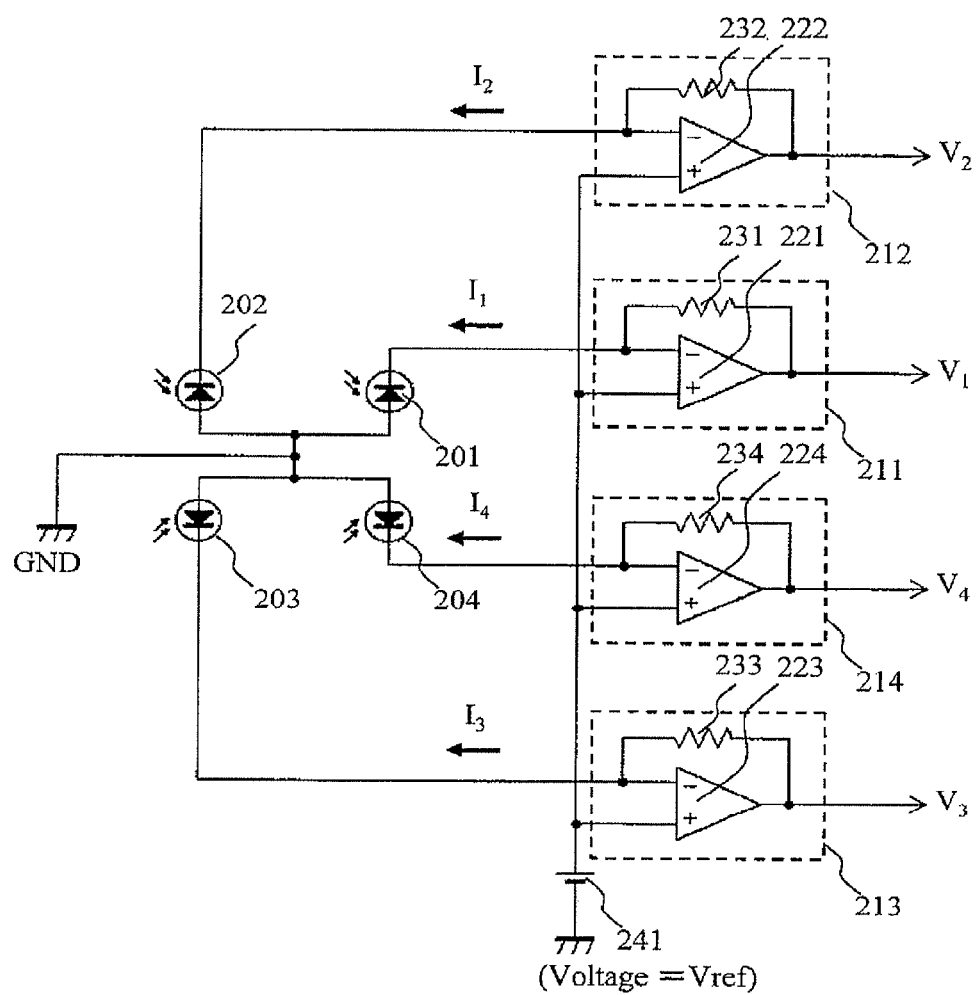
FIG. 2 is a diagram showing a configuration example of a conventional optical signal detecting circuit.
Figure 3:
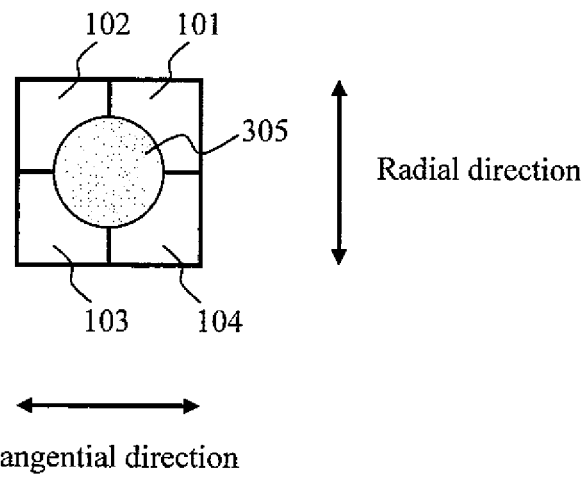
FIG. 3 is a diagram showing the arrangement of four photodiodes.

FIG. 1 is a diagram showing a configuration example of an optical signal detecting circuit according to the present invention. The optical signal detecting circuit consists of photodiodes 101, 102, 103, and 104, current-to-voltage converters 111, 112, 113, and 114, and reference voltage sources 141 and 142. As shown in FIG. 3, one photodiode is segmented vertically once and horizontally once to obtain four elements. The respective photodiodes 101, 102, 103, and 104 are these segmented elements, and are contiguously arranged counter-clockwise in the listed order. When this circuit is employed in an optical disk reproducing device, the quadrant photodiode is positioned along the directions shown in FIG. 3 which correspond to a radial direction and a tangential direction of an optical disk medium, respectively. A laser light reflected from the optical disk is condensed as an optical spot 305 and enters the quadrant photodiode. Currents flowing into the photodiodes are proportional to the intensity of the light received by the respective photodiodes. The current-to-voltage converters 111, 112, 113, and 114 include operational amplifiers 121, 122, 123, and 124 and feedback resisters 131, 132, 133, and 134, respectively, and thus form transimpedance amplifiers.

The photodiodes 101 and 102 are connected to each other at their cathodes, and their connection point is connected to the inverting input terminal of the operational amplifier 121. The photodiodes 102 and 104 are connected to each other at their anodes, and their connection point is connected to the inverting input terminal of the operational amplifier 123. The photodiodes 101 and 103 are connected to each other at their anodes, and their connection point is connected to the inverting input terminal of the operational amplifier 122. The photodiodes 103 and 104 are connected to each other at their cathodes, and their connection point is connected to the inverting input terminal of the operational amplifier 124. Moreover, the reference voltage source 141 is connected, at its positive terminal, to the non-inverting input terminals of the operational amplifiers 122 and 123, and is grounded at its negative terminal. The positive terminal of the reference voltage source 141 is connected to the non-inverting input terminals of the operational amplifiers 122 and 123. The reference voltage source 142 is connected, at its positive terminal, to the non-inverting input terminals of the operational amplifiers 121 and 124, and is grounded at its negative terminal. A reference voltage $Vref_2$ generated by the reference voltage source 142 is larger than a reference voltage $Vref_1$ generated by the reference voltage source 141. Thereby, due to the virtual short characteristics of the operational amplifiers, a reverse bias voltage of $Vref_2-Vref_1$ is applied to each of the four photodiodes.

The current-to-voltage converter 111 converts a current $I_1+I_2$ obtained by adding currents $I_1$ and $I_2$ flowing into the respective photodiodes 101 and 102 into a voltage $V_1$ and outputs the voltage $V_1$. The current-to-voltage converter 113 converts a current $I_2+I_4$ obtained by adding currents 12 and 14 flowing out from the respective photodiodes 102 and 104 into a voltage $V_3$ and outputs the voltage $V_3$. The current-to-voltage converter 112 converts a current $I_1+I_3$ obtained by adding currents $I_1$ and $I_3$ flowing out from the respective photodiodes 101 and 103 into a voltage $V_2$ and outputs the voltage $V_2$. The current-to-voltage converter 114 converts a current $I_3+I_4$ obtained by adding currents $I_3$ and $I_4$ flowing into the respective photodiodes 103 and 104 into a voltage $V_4$ and outputs the voltage $V_4$.

A first characteristic of this optical signal detecting circuit is that a current signal obtained by adding currents flowing through two photodiodes is converted into a voltage signal by a single current-to-voltage converter. Thereby, only two current-to-voltage converters are needed to acquire the RF signals. Accordingly, the effect of the amplifier noise can be reduced. In principle, the relative value of the amplifier noise included in the RF signal can be 3 dB less than in an RF signal provided by the conventional optical signal detecting circuit in which four photodiodes are connected to four current-to-voltage converters in a one-to-one manner.

A second characteristic is that not only the currents flowing into the photodiodes, but also the currents flowing out from the photodiodes are taken out as voltage signals, unlike the conventional optical signal detecting circuit which takes out only the currents flowing into the photodiodes as a voltage signal. Thereby, as will be described later, a pair of RF signals each having a reversed polarity to the other can be taken out. This doubles the amplitude of the RF signal. Consequently, the relative value of the amplifier noise included in the RF signal can be reduced.

A third characteristic is that, due to the virtual short characteristics of the operational amplifiers, the reverse bias voltage of $Vref_2-Vref_1$ is applied between the terminals of each photodiode by applying two different magnitudes of reference voltages, namely, the reference voltage $Vref_1$ and the reference voltage $Vref_2$ to the current-to-voltage converter. This reduces the terminal capacitance of each photodiode, and thus can produce the effect of the frequency characteristics improvement equivalent to that achieved by the conventional optical signal detecting circuit.

It is shown next that all of three signals—the focus error signal, the tracking error signal, and the RF signal—can be obtained by using this optical signal detecting circuit. When all of the resistance values of the feedback resisters 131, 132, 133, and 134 are R, the output voltages $V_1$, $V_2$, $V_3$, and $V_4$ are as follows.

$$\begin{cases} V_1 = Vref_2 + R(I_1 + I_2) \\ V_2 = Vref_1 - R(I_1 + I_3) \\ V_3 = Vref_1 - R(I_2 + I_4) \\ V_4 = Vref_2 + R(I_3 + I_4) \end{cases} \quad (3)$$

Assuming that the astigmatism method and the push-pull method are employed as the focusing control method and the tracking control method, respectively, the focus error signal (FE), the tracking error signal (TE), and the RF signal (RF) are generated using $V_1$ to $V_4$ by the following calculations.

$$\begin{cases} FE = V_2 - V_3 = -R[(I_1 + I_3) - (I_2 + I_4)] \\ TE = V_1 - V_4 = R[(I_1 + I_2) - (I_3 + I_4)] \\ RF = V_1 + V_4 = 2Vref_2 + R(I_1 + I_2 + I_3 + I_4) \end{cases} \quad (4)$$

Note that the RF signal can be generated also by the calculation described below.

$$RF = V_2 + V_3 = 2Vref_1 - R(I_1 + I_2 + I_3 + I_4) \quad (5)$$

The above has shown that all of three signals—the focus error signal, the tracking error signal, and the RF signal—can be obtained by using the optical signal detecting circuit of the present invention.

It should be noted that, although not shown in FIG. 1, a power supply voltage actually need to be provided to actuate the current-to-voltage converters. Moreover, although not shown in FIG. 1, a phase compensation capacitor is often inserted in parallel to each of the feedback resister of the current-to-voltage converter in order to reliably obtain negative feedback stability in the current-to-voltage converters.

[Embodiment 2] Addition of RF Signal Generating Circuit

Figure 4:
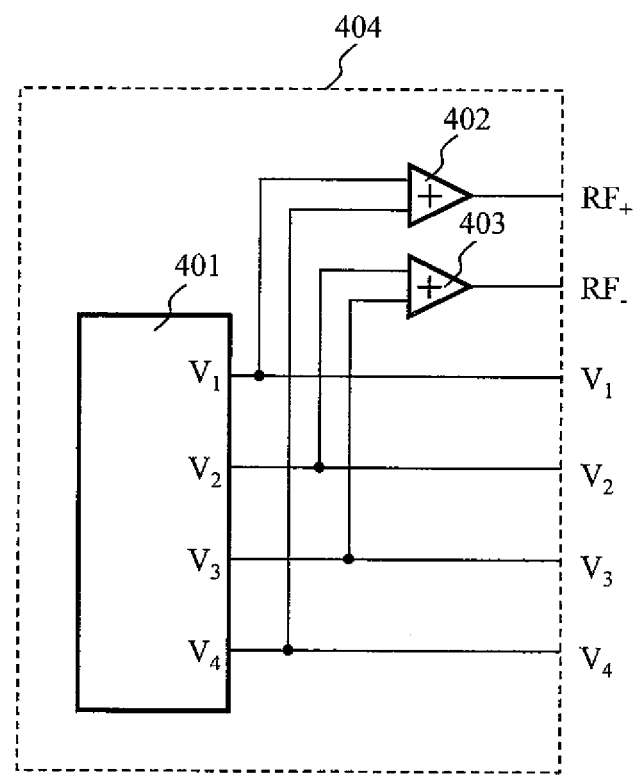
FIG. 4 is a diagram showing another configuration example of the optical signal detecting circuit of the present invention.

FIG. 4 is a diagram showing another configuration example of the optical signal detecting circuit of the present invention. An optical signal detecting circuit 401 is the one shown in Embodiment 1 described above. The optical signal detecting circuit of the present embodiment has a configuration in which at least one of adders 402 and 403 is added to the optical signal detecting circuit 401. These adders are used to generate an RF signal from output signals from the optical signal detecting circuit. The adder 402 adds the output voltages $V_1$ and $V_4$ of the optical signal detecting circuit 401, and output the result as an $RF_+$. The adder 403 adds the output voltages $V_2$ and $V_3$ of the optical signal detecting circuit 401, and output the result as an RF.

The RF signal is generated based on the above-given equations 4 or 5. The RF signal generating circuit having such a function of generating RF signals is added to the optical signal detecting circuit. The two RF signals are a pair of signals each having a reversed polarity to the other after excluding direct current offset components generated from the reference voltages, and accordingly can be used as a pair of differential signals $RF_+$ and $RF_-$. Therefore, the following holds true.

$$\begin{cases} RF_+ = V_1 + V_4 = 2Vref_2 + R(I_1 + I_2 + I_3 + I_4) \\ RF_- = V_2 + V_3 = 2Vref_1 - R(I_1 + I_2 + I_3 + I_4) \end{cases} \quad (6)$$

Each of $RF_+$ and $RF_-$ can be used as an RF signal independently. However, by pairing up $RF_+$ and $RF_-$, the influence of common mode noise received by a transmission system can be drastically reduced. This is accomplished by transmitting the pair of $RF_+$ and $RF_-$ from the optical signal detecting circuit to a signal processing system of a drive device by using adjacent lines and by causing the signal processing system to receive a difference between the pair to generate an RF signal. The RF signal thus obtained is as follows.

$$RF = RF_+ - RF_- = 2(Vref_2 - Vref_1) + 2R(I_1 + I_2 + I_3 + I_4) \quad (7)$$

When the pair of differential signals is generated with a generally-used differential transmission method, each of the paired RF signals thus generated has signal components and amplifier noise components, the polarity of which are the reverse of the other one of the pair. Accordingly, the relative value of the amplifier noise included in the RF signal does not change even after the difference of the paired signals is received. On the other hand, in the differential transmission method employing the present invention, the amplifier noise included in each of the paired differential signals $RF_+$ and $RF_-$ is generated by the separate current-to-voltage converters, and is therefore uncorrelated to the other. Accordingly, in principle, the relative value of the amplifier noise included in the RF signal after undergoing the differential reception is smaller by 3 dB compared to before undergoing the differential reception.

According to what has been described, as a result of combination with the effect achieved by the configuration of Embodiment 1, the optical signal detecting circuit of the present invention can reduce the relative value of the amplifier noise included in the RF signal by 6 dB, compared to that in an RF signal provided by the conventional optical signal detecting circuit. In other words, the relative value of the amplifier noise included in the RF signal can be made equivalent to that in an RF signal provided by an optical signal detecting circuit with a single pair of the photodiode and the current-to-voltage converter. This results in the cancellation of the demerit of an amplifier noise increase caused by using a quadrant photodiode in order to acquire servo signals.

[Embodiment 3] Drive Device

Figure 5:
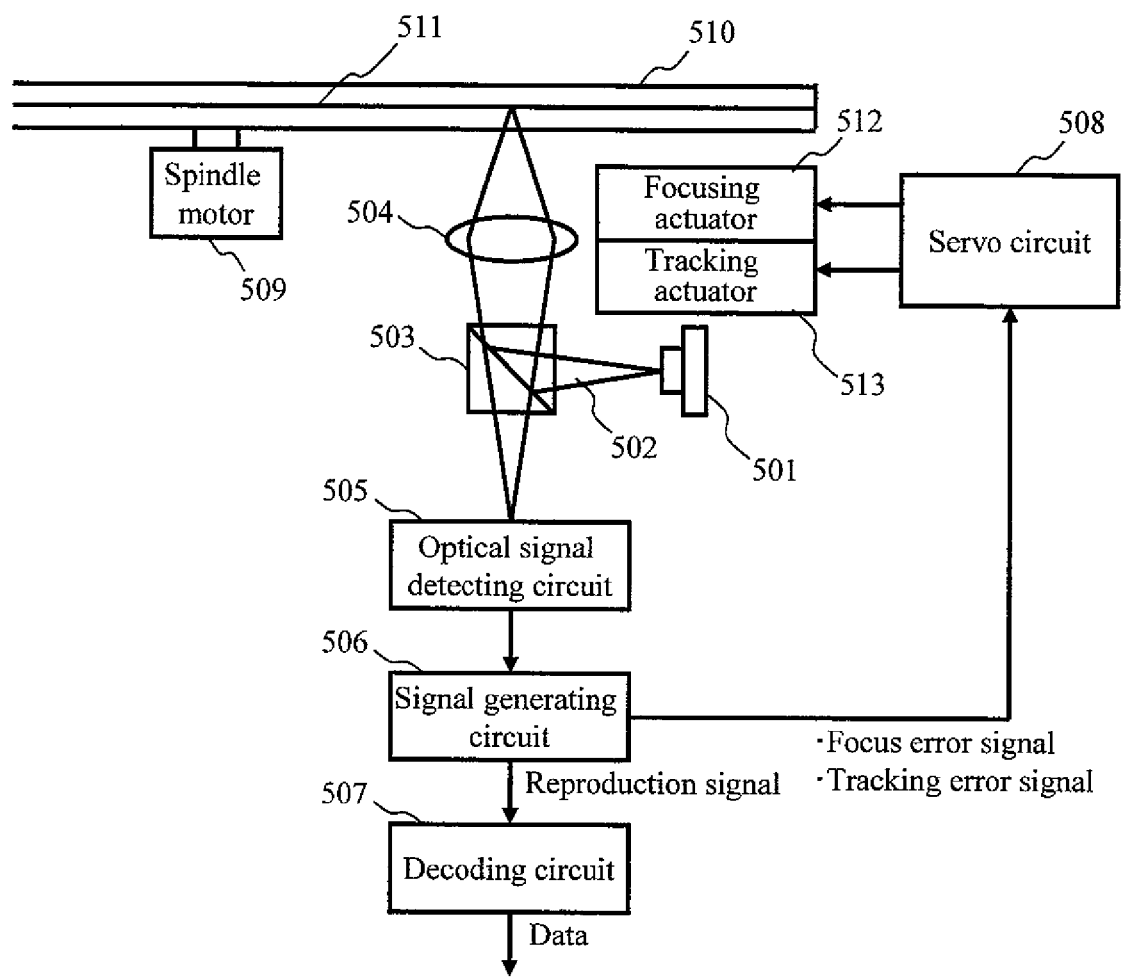
FIG. 5 is a diagram showing a configuration example of an optical disk reproducing device using the optical signal detecting circuit of the present invention.

FIG. 5 is a diagram showing a configuration example of an optical disk reproducing device using the optical signal detecting circuit of the present invention. A laser light 502 emitted from a laser diode 501 is reflected by a beam splitter 503. The reflected laser light 502 is then condensed by an objective lens 504 and applied onto an information recording surface 511 of an optical disk 510. The objective lens 504 is driven in a direction perpendicular to the information recording surface 511 by a focusing actuator 512, and is driven in a radial direction of the optical disk 510 by a tracking actuator 513. The optical disk 510 is fixed to a spindle motor 509 and is thereby driven to rotate. The laser light 502 reflected from the information recording layer 511 passes through the beam splitter 503 and enters an optical signal detecting circuit 505. The optical signal detecting circuit 505 is, for example, the one shown in Embodiment 1 or Embodiment 2 described above. The optical signal detecting circuit 505 converts the entered light into a voltage signal and outputs the voltage signal. The voltage signal thus outputted is then inputted to a signal generating circuit 506. The signal generating circuit 506 generates a focus error signal, a tracking error signal, and an RF signal. The focus error signal and the tracking error signal are transmitted to a servo circuit 508. The servo circuit 508 drives the objective lens 504 by controlling the focusing actuator 512 and the tracking actuator 513 based on the focus error signal and the tracking error signal, respectively. The RF signal generated by the signal generating circuit 506 is decoded into binary data by a decoding circuit 507.

Figure 6:
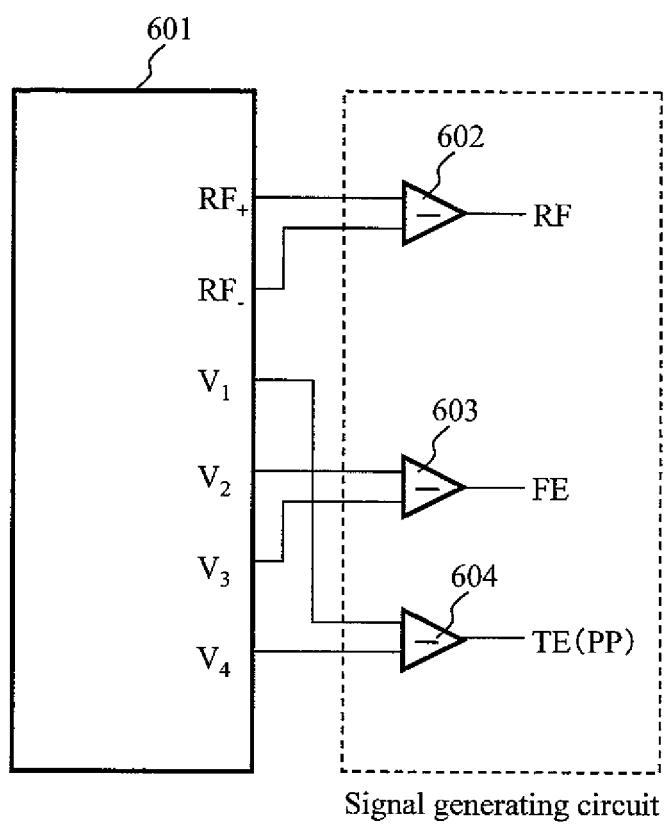
FIG. 6 is a diagram showing an example of how a signal generating circuit using the optical signal detecting circuit of the present invention generates a focus error signal, a tracking error signal, and an RF signal.

Next, the signal generating circuit 506 is shown in detail. FIG. 6 is a diagram showing an example of how the signal generating circuit 506 generates the focus error signal, the tracking error signal, and the RF signal. An optical signal detecting circuit 601 is the optical signal detecting circuit of Embodiment 2. A subtracter 602 performs subtraction on (receives a difference between) the output voltages $RF_+$ and $RF_-$ from the optical signal detecting circuit 601 and thus generates an RF signal (RF). Moreover, a subtracter 603 performs subtraction on the output voltages $V_2$ and $V_3$ and thus generates a focus error signal (FE) based on the astigmatism method. Moreover, a subtracter 604 performs subtraction on the output voltages $V_1$ and $V_4$ and thus generates a tracking error signal (TE) based on the push-pull method.

[Embodiment 4] Case of Using Differential Phase Detection (DPD)

Figure 7:
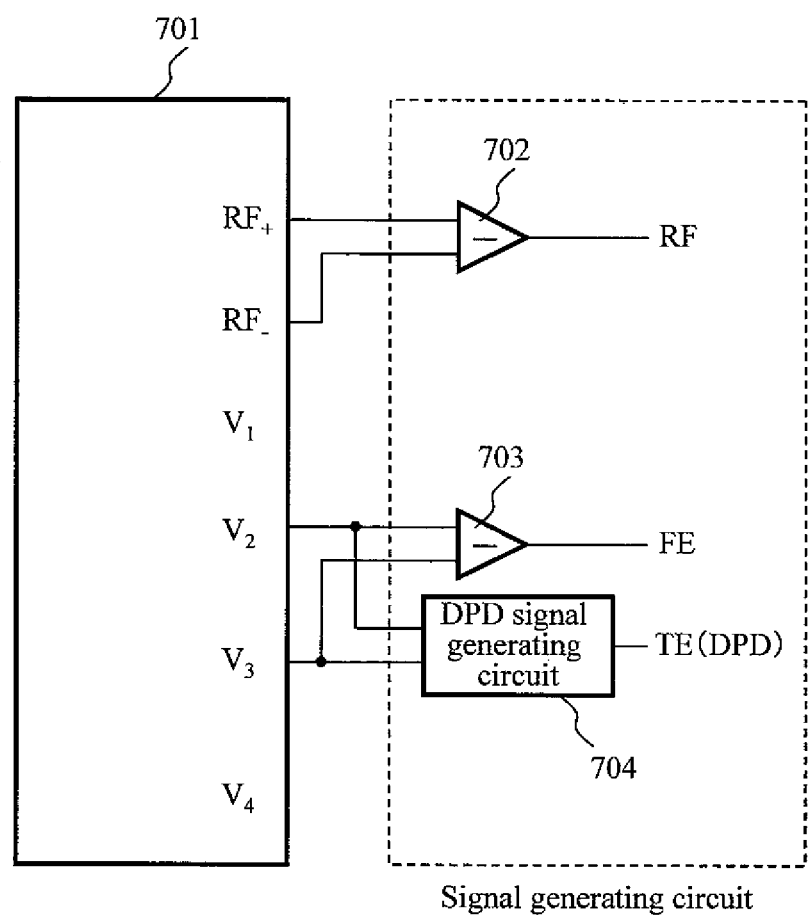
FIG. 7 is a diagram showing another configuration example of how the signal generating circuit using the optical signal detecting circuit of the present invention generates the focus error signal, the tracking error signal, and the RF signal.

FIG. 7 is a diagram showing another configuration example of the signal generating circuit in the optical disk reproducing device of Embodiment 3. An optical signal detecting circuit 701 is the same one as the optical signal detecting circuit 601. A subtracter 702 performs subtraction on (receives a difference between) the output voltages $RF_+$ and $RF_-$ from the optical signal detecting circuit 701 and thus generates an RF signal (RF). Moreover, a subtracter 703 performs subtraction on the output voltages $V_2$ and $V_3$ and thus generates a focus error signal (FE) based on the astigmatism method. This is, so far, the same as Embodiment 3. However, in a signal generating circuit of the present embodiment, the output voltages $V_2$ and $V_3$ are inputted into a DOD signal generating circuit 704. The DPD signal generating circuit 704 generates a tracking error signal (TE) based on a differential phase detection (DPD) method. A phase difference between $V_2$ and $V_3$ is reflected in the tracking error signal based on the DPD method.

This method is applied to a disk, such as a read-only memory (ROM) disk, for which a tracking error signal having sufficient amplitude cannot be obtained with the push-pull method.

[Embodiment 5] Configuration Example of Optoelectronic Integrated Circuit (OEIC)

Figure 8:
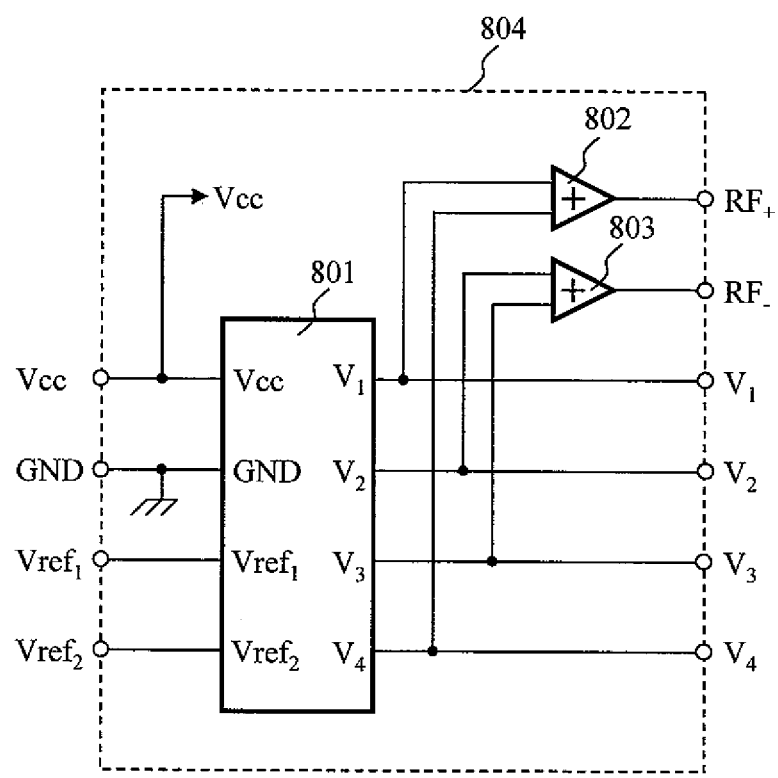
FIG. 8 is a diagram showing a configuration example of an optoelectronic integrated circuit using the optical signal detecting circuit of the present invention.

FIG. 8 is a diagram showing a configuration example of an optoelectronic integrated circuit (OEIC) using the optical signal detecting circuit of the present invention. An optoelectronic integrated circuit 804 consists of an optical signal detecting circuit 801 and adders 802 and 803 all of which are integrated in a one-chip integrated circuit (IC). In other words, the optoelectronic integrated circuit 804 is the one in which the circuit of Embodiment 2 is integrated in one chip. The optoelectronic integrated circuit 804 includes a Vcc input terminal, a GND terminal, a $Vref_1$ input terminal, a $Vref_2$ input terminal, a $V_1$ output terminal, a $V_2$ output terminal, a $V_3$ output terminal, a $V_4$ output terminal, an $RF_-$ output terminal, and an $RF_-$ output terminal. A power supply voltage is applied from the Vcc input terminal to the optical signal detecting circuit 801 and to the adders 802 and 803. Meanwhile, a reference voltage is applied from the $Vref_1$ input terminal and the $Vref_2$ input terminal to the current-to-voltage converters in the optical signal detecting circuit. Output voltage signals $V_1$, $V_2$, $V_3$, and $V_4$ of the current-to-voltage converters are outputted from the $V_1$ output terminal, the $V_2$ output terminal, the $V_3$ output terminal, the $V_4$ output terminal, respectively. Output voltage signals $RF_+$ and $RF_-$ of the adders 802 and 803 are outputted from the $RF_+$ output terminal and the $RF_-$ output terminal, respectively.

In the following, some points are added as to the embodiments described above.

In the optical signal detecting circuit of Embodiment 1 or Embodiment 2, the feedback resistance values of the four current-to-voltage converters, namely, the current-to-voltage conversion gains have to be equal to each other. This is for the purpose of allowing the output voltage of each of the current-voltage converters to accurately reflect the intensity of light received by its corresponding one of the photodiodes. In the optoelectronic integrated circuit of Embodiment 5, when the resistance values are found out to be varying from one to another as a result of measurement after the manufacture of the integrated circuit, the resistance values can be adjusted by subjecting the resisters in the integrated circuit to laser trimming processing or the like.

Moreover, although the configurations according to the embodiments described above employ a quadrant photodetector, it is also possible to employ a combination of four photodetectors and another photodetector. For example, when a differential push-pull (DPP) method is employed as the tracking method, a tracking error signal is generated from a push-pull signal provided by each of the four photodetectors of the embodiments described above and an additionally provided photodetector. Here, the four photodetectors each receive main beams, while the additional photodetector receives sub-beams.

The embodiments described above are preferred concrete examples of the present invention. However, the scope of the present invention is not limited to these forms.

Explanation of Reference Numerals

101: first photodiode, 102: second photodiode, 103: third photodiode, 104: fourth photo diode,
111: first current-to-voltage converter, 112: second current-to-voltage converter, 113: third current-to-voltage converter, 114: fourth current-to-voltage converter,
121: first operational amplifier, 122: second operational amplifier, 123: third operational amplifier, 124: fourth operational amplifier,
131: first feedback resister, 132: second feedback resister, 133: third feedback resister, 134: fourth feedback resister,
141: first reference voltage source, 142: second reference voltage source
201: first photodiode, 202: second photodiode, 203: third photodiode, 204: fourth photo diode,
211: first current-to-voltage converter, 212: second current-to-voltage converter, 213: third current-to-voltage converter, 214: fourth current-to-voltage converter,
221: first operational amplifier, 222: second operational amplifier, 223: third operational amplifier, 224: fourth operational amplifier,
231: first feedback resister, 232: second feedback resister, 233: third feedback resister, 234: fourth feedback resister,
241: first reference voltage source, 305: optical spot,
401: optical signal detecting circuit, 402: adder, 403: adder, 404: optical signal detecting circuit,
501: laser diode, 502: laser light, 503: beam splitter, 504: objective lens, 505: optical signal detecting circuit, 506: signal generating circuit, 507: decoding circuit, 508: servo circuit, 509: spindle motor, 510: optical disk, 511: information recording layer, 512: focusing actuator, 513: tracking actuator,
601: optical signal detecting circuit, 602: subtracter, 603: subtracter, 604: subtracter, 701: optical signal detecting circuit, 702: subtracter, 703: subtracter, 704: DPD signal generating circuit,
801: optical signal detecting circuit, 802: adder, 803: adder, 804: optoelectronic integrated circuit

What is claimed is:

1. An optical signal detecting circuit comprising:
a quadrant photodetector in which a first photodetector, a second photodetector, a third photodetector, and a fourth photodetector are contiguously arranged counterclockwise in the listed order, each of the photodetectors receiving an optical signal and converting the optical signal into a current signal; and a first current-to-voltage converter, a second current-to-voltage converter, a third current-to-voltage converter, and a fourth current-to-voltage converter, each of which converts the current signal to a voltage signal and outputs the voltage signal, wherein the first current-to-voltage converter converts a current signal into a first voltage signal and outputs the first voltage signal, the current signal being obtained by adding current signals flowing respectively into the first photodetector and the second photodetector, the second current-to-voltage converter converts a current signal into a second voltage signal and outputs the second voltage signal, the current signal being obtained by adding current signals flowing out respectively from the first photodetector and the third photodetector, the third current-to-voltage converter converts a current signal into a third voltage signal and outputs the third voltage signal, the current signal being obtained by adding current signals flowing out respectively from the second photodetector and the fourth photodetector, the fourth current-to-voltage converter converts a current signal into a fourth voltage signal and outputs the fourth voltage signal, the current signal being obtained by adding current signals flowing respectively into the third photodetector and the fourth photodetector, and by applying a first reference voltage, generated by a first reference voltage source, to the second current-to-voltage converter and the third current-to-voltage converter and applying a second reference voltage, generated by a second reference voltage source, which is higher than the first reference voltage, to the first current-to-voltage converter and the fourth current-to-voltage converter, a reverse bias voltage is applied to the first photodetector, the second photodetector, the third photodetector, and the fourth photodetector, the reverse bias voltage being equal to a difference between the second reference voltage and the first reference voltage.

2. The optical signal detecting circuit according to claim 1, further comprising at least one of:
a first adder that adds the first voltage signal and the fourth voltage signal, and outputs a first RF signal; and
a second adder that adds the second voltage signal and the third voltage signal, and outputs a second RF signal.

3. An information reproducing device comprising:
an optical disk having an information recording layer;
a driving unit that drives the optical disk;
a laser light source that emits a laser light;
an objective lens for condensing the laser light and applying the condensed laser light onto the information recording layer of the optical disk;
a focusing actuator for driving the objective lens in a direction perpendicular to the information recording layer;
a tracking actuator for driving the objective lens in a radial direction of the optical disk;
the optical signal detecting circuit according to claim 2;
a signal generating circuit that generates a focus error signal based on an astigmatism method from the second voltage signal and the third voltage signal, generates a tracking error signal based on a push-pull method from the first voltage signal and the fourth voltage signal, and generates a third RF signal from the first RF signal and the second RF signal; and
a decoding circuit that decodes the third RF signal into data, wherein the quadrant photodetector receives the laser light reflected by the information recording layer,
the focusing actuator is controlled based on the focus error signal, and
the tracking actuator is controlled based on the tracking error signal.

4. An information reproducing device comprising:
an optical disk having an information recording layer;
a laser light source that emits a laser light;
an objective lens for condensing the laser light and applying the condensed laser light onto the information recording layer of the optical disk;
a focusing actuator for driving the objective lens in a direction perpendicular to the information recording layer;
a tracking actuator for driving the objective lens in a radial direction of the optical disk;
the optical signal detecting circuit according to claim 2;
a signal generating circuit that generates a focus error signal based on an astigmatism method from the second voltage signal and the third voltage signal, generates a tracking error signal based on a DPD method from the second voltage signal and the third voltage signal, and generates a third RF signal from the first RF signal and the second RF signal; and
a decoding circuit that decodes the third RF signal into data, wherein the quadrant photodetector receives the laser light reflected by the information recording layer,
the focusing actuator is controlled based on the focus error signal, and
the tracking actuator is controlled based on the tracking error signal.

5. An optoelectronic integrated circuit comprising at least:
the optical signal detecting circuit according to claim 2;
a power supply terminal for applying a power supply voltage to the optical signal detecting circuit and the adder;
a ground terminal,
a first reference voltage terminal for applying the first reference voltage;
a second reference voltage terminal for applying the second reference voltage;
a terminal for outputting the first voltage signal;
a terminal for outputting the second voltage signal;
a terminal for outputting the third voltage signal;
a terminal for outputting the fourth voltage signal;
a terminal for outputting the first RF signal; and
a terminal for outputting the second RF signal.

6. A detecting circuit comprising:
a plurality of current-to-voltage converters; and
a plurality of detectors, wherein
a first reference voltage is applied to a predetermined current-to-voltage converter among the plurality of current-to-voltage converters,
a second reference voltage is applied to another current-to-voltage converter among the plurality of current-to-voltage converters, the second reference voltage being greater than the first reference voltage, and
a reverse bias voltage of a magnitude corresponding to the difference between the second reference voltage and the first reference voltage is applied to each of the plurality of detectors.

* * * * *